United States Patent Office 3,053,895
Patented Sept. 11, 1962

---

3,053,895
UNSYMMETRICAL DIALKYLAMINOPHENOLS
Warren W. Kaeding, Concord, Calif., assignor to The Dow Chemical Company, Midland, Mich., a corporation of Delaware
No Drawing. Filed Nov. 4, 1959, Ser. No. 850,781
6 Claims. (Cl. 260—574)

This invention relates to aminophenols and is particularly concerned with unsymmetrical dialkylaminophenols having the formula

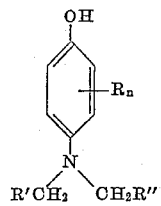

In this and succeeding formulas, each R is an alkyl radical containing from 1 to 4 carbon atoms, inclusive, R' is a hydrogen radical or an alkyl radical containing from 1 to 5 carbon atoms, inclusive, R" is an alkyl radical containing from 1 to 5 carbon atoms, inclusive, $n$ is an integer of from 1 to 3 inclusive, and wherein R' and R" are always different radicals and the total carbon content of $R_n$ is not greater than 4. This invention also relates to the preparation of unsymmetrical dialkylaminophenols, to the preparation of an intermediate methylaminophenol and to the method of reacting unsymmetrical dialkylaminophenols with methyl isocyanate to produce unsymmetrical dialkylaminophenyl methyl-carbamates.

The unsymmetrical dialkylaminophenols of the present invention are colorless or light colored liquids or low melting solids. These phenols are soluble in many organic solvents such as ethanol, propanol and dimethylformamide and substantially insoluble in water. These compounds are useful as toxicants in antiseptic and germicidal compositions for the control of bacteria and fungi, as intermediates in the preparation of methyl-carbamates which are useful in insecticidal compositions and as curing agents in the preparation of epoxy resins.

The compounds of the present invention may be prepared by a stepwise alkylation of appropriate aminophenol to produce first an intermediate monoalkylaminophenol followed by a second alkylation to produce the desired unsymmetrical dialkylaminophenol.

In preparing the intermediate monoalkylaminophenol, the appropriate aminophenol is reacted with an appropriate aliphatic aldehyde to produce a Schiff base, thereafter, reacting the Schiff base with hydrogen in the presence of palladium on charcoal catalyst to produce an intermediate lower alkylaminophenol. The sequence of reactions may be represented by the following equations:

(1)

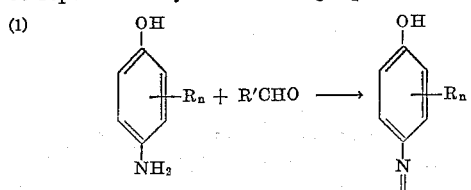

(2)

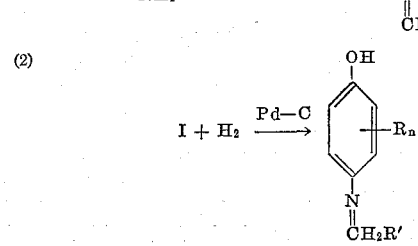

Alternatively, when the monoalkylaminophenol intermediate is a methylaminophenol, the appropriate aminophenol is reacted with dimethyl sulfate to produce the methyl sulfate salt of a monomethylaminophenol; thereafter the salt is neutralized with base to produce the desired monomethylaminophenol. The sequence of reactions may be represented by the following equations:

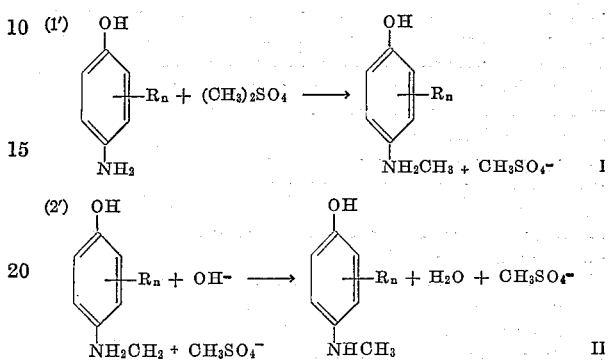

The intermediate monoalkylaminophenol prepared a above described is reacted with an aliphatic aldehyde and hydrogen in the presence of palladium on charcoal catalyst (reductive alkylation) to produce the desired unsymmetrical dialkylaminophenol. The reaction may be represented by the following equation:

(3)

II or II' + R"CHO + H₂  →  [Pd-C]  aminophenol product

In carrying out the reaction represented by Equation 1 substantially equimolar proportions of the appropriate aminophenol and appropriate aldehyde are employed. I is frequently advantageous to use a slight excess of the aldehyde. Reaction may be carried out in the temperature range of from about 15° to 60° C. over a period o from 5 to 30 minutes. The reaction is preferably carried out in solution or in the presence of an inert solvent Suitable solvents include methanol, ethanol, methanol water, ethanol-water or aqueous hydrochloric acid. The reaction may be carried out under atmospheric conditions or in an inert atmosphere such as in the presence of carbon dioxide or nitrogen. Carrying out the reaction in inert atmosphere is preferred when an alkyl substituent is absent in the position meta to the hydroxy group of the aminophenol.

In one modification, the reaction is carried out employing an alcoholic solvent. A 50–50 (by volume) alcohol water mixture is the preferred solvent composition. In such procedure, the Schiff base generally remains in solution and may be recovered by pouring the reaction mixture onto ice or an ice-water mixture to precipitate the desired Schiff base. The latter may then be recovered by filtration and purified by washing or recrystallization.

In the second modification, the reaction is carried ou by adding with agitation the appropriate aldehyde to the appropriate aminophenol dispersed in sufficient aqueou hydrochloric acid that the aminophenol is present as it hydrochloride salt. After completion of the addition, sodium acetate is added in amounts sufficient to react with the hydrochloride. The sodium acetate may be added in the solid form or as its aqueous solution. As a result of these operations, a reaction takes place with the formation of the Schiff base intermediate which precipitates in the reaction mixture. The Schiff base intermediate frequently precipitates as an oil but solidifies on cooling the reaction mixture below room temperature. The intermediate compound may then be recovered and, if desired, purified as previously described.

The reaction represented by Equation 2 is carried out in a low pressure hydrogenation apparatus. The Schiff base intermediate, palladium on charcoal catalyst and a solvent, preferably methanol or ethanol, are then mixed together in the glass bomb of a hydrogenation apparatus. The amount of the catalyst employed is from about 1.5 to about 7 percent by weight of the reactants. Hydrogen gas is then introduced into the bomb to purge the air therefrom and thereafter added in an amount sufficient to establish a pressure of from 20 to 50 pounds per square inch. The hydrogenation is then accomplished by shaking the bomb on a hydrogenation apparatus at room temperature until the pressure drop indicates absorption of the theoretical amount of hydrogen (equimolar with respect to the Schiff base employed). After completion of the hydrogenation, the remaining hydrogen is vented, the bomb opened and the catalyst removed by filtration. A lower alkylaminophenol intermediate may then be recovered from the filtrate by vaporizing off the solvent and then purifying by conventional procedures.

The reactions represented by Equations 1' and 2' are carried out by adding with vigorous stirring a substantially equimolar proportion or slight excess of dimethyl sulfate to a suspension of the appropriate aminophenol in water. The stirring is continued at ambient temperature for a period of from about 0.5 to 2 hours whereupon a reaction takes place with the formation of the methyl sulfate salt of a monomethylaminophenol intermediate as evidenced by the dissolution of the aminophenol. The salt is recovered as residue from the aqueous solution by vaporizing off the water. The salt may be purified, if desired, by washing with a solvent such as acetone. The salt is then dissolved in minimal amount of water and neutralized with dilute alkali whereupon the desired monomethylaminophenol intermediate precipitates as a white crystalline solid. The latter is recovered according to conventional procedures.

In carrying out the reaction represented by Equation 3, the lower alkylaminophenol, prepared according to (1) and (2) or (1') and (2') above, an aliphatic aldehyde and palladium on charcoal catalyst are mixed together in an alcohol solvent and placed in a hydrogenation bomb. Addition of a small amount, about 1.5 to 5 percent by weight of the reactants, of sodium acetate faciliates the reaction and is found desirable. Hydrogen pressure of from 20 to 50 pounds per square inch is then established as previously described and the bomb shaken at room temperature until the theoretical amount of hydrogen (equimolar with respect to the lower alkylaminophenol employed) is absorbed to produce the desired unsymmetrical dialkylaminophenol product.

In a modified procedure, the steps represented by Equations 2 and 3 may be substantially combined so that the intermediate lower alkylaminophenol is reductively alkylated without previous isolation. In such operation, the reaction mixture present in the bomb after the completion of the second step is retained in the hydrogenation apparatus and the second aliphatic aldehyde and sodium acetate added thereto and a pressure of from 20 to 50 pounds per square inch of hydrogen established. The product resulting from such operation is then isolated as previously set forth.

The preferred method for carrying out the reaction depends on whether or not one of the alkyl groups is methyl. If the desired final product is to have the structure

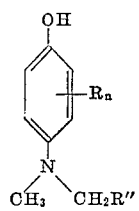

the appropriate aminophenol is stirred with a substantially equimolar proportion of methyl sulfate in aqueous medium until all of the reactant aminophenol is in solution. Thereafter the water is vaporized off and the residue neutralized with alkali in aqueous medium to precipitate the desired methylaminophenol intermediate. The latter is recovered by filtration and placed in a hydrogenation apparatus with a substantially equimolar proportion of an aliphatic aldehyde, an alcohol solvent, about 2.5 percent by weight sodium acetate and about 2.5 percent by weight of palladium on charcoal catalyst. Hydrogen is introduced to first purge the bomb and thereafter to establish about 50 pounds per square inch pressure. The mixture is then shaken until a theoretical amount of hydrogen has been absorbed to produce the desired methyl-lower-alkyl-aminophenol product. The latter is recovered by conventional procedures.

In a more general preferred method for carrying out the reaction, an appropriate aminophenol and a slight molar excess of an aliphatic aldehyde are mixed together in an aqueous alcohol solution to produce the intermediate Schiff base. The Schiff base is then placed in a hydrogenation bomb and about 2.5 percent by weight of the catalyst, palladium on charcoal added thereto and the bomb purged with hydrogen and a hydrogen pressure of about 50 pounds per square inch established. The bomb is shaken at room temperature until the pressure drop indicates absorption of the theoretical amount of hydrogen. The pressure is then released by venting the hydrogen and a second aliphatic aldehyde and sodium acetate added to the reaction mixture. The hydrogenation system is then again purged. A pressure of about 50 pounds per square inch of hydrogen is established and the bomb again shaken at room temperature until the theoretical pressure drop is noted. After completion of the hydrogenation the hydrogen is vented and the catalyst removed by filtration, the solvent removed by distillation and the desired product recovered as residue. The residue is then purified by conventional procedures.

The following examples illustrate the present invention but are not to be construed as limiting.

EXAMPLE 1

*4-(Normal-Butyl-Methylamino)-3,5-Xylenol*

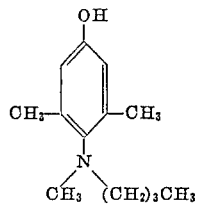

Fifty grams (0.36 mole) of 4-amino-3,5-xylenol (M.P.=180°–183° C.) was suspended in 170 milliliters of water at room temperature. To this supension was added with vigorous stirring 40 milliliters (0.43 mole) of dimethyl sulfate. In approximately 40 minutes, all of the solid was in solution and the temperature of the mixture was 42° C. Activated charcoal was added to decolorize the solution and the latter thereafter filtered to remove the charcoal to obtain a light amber filtrate. The water was removed from the filtrate by distillation under reduced pressure with a bath temperature of 100° C. A viscous, amber oil was obtained as residue which solidified on cooling to room temperature. Dry acetone was then added to the residue to obtain a methyl sulfate salt of the monomethylaminoxylenol having the structure

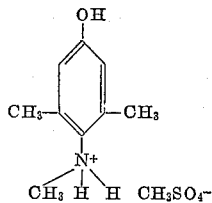

as a while solid. The salt was dissolved in a small amount of water and neutralized with aqueous alkali to obtain a quantitative yield of 4-methylamino-3,5-xylenol intermediate as a white solid melting at 137°–139° C.

18 grams (0.119 mole) of 4-methylamino-3,5-xylenol prepared as above described, 2 grams of 5 percent palladium on charcoal, 2 grams of sodium acetate trihydrate, 100 milliliters of methanol and 18 milliliters (14.4 grams; 0.2 mole) of normal-butyraldehyde were placed in a glass bomb of a low pressure hydrogenation apparatus and hydrogen introduced until a pressure of 50 pounds per square inch (p.s.i.) was established. The bomb was shaken whereupon absorption of hydrogen (hydrogenation) took place over a period of one hour. The reaction mixture was filtered to remove the catalyst and the methanol filtrate diluted with 800 milliliters of ice-water to precipitate the desired 4-(normal-butylmethylamino)-3,5-xylenol product as an oil. The latter was extracted from the aqueous mixture with pentane, the pentane then evaporated off, and the residual oil distilled under reduced pressure to obtain a purified product as a light amber oil having a boiling point of 115°–118° C. at 2 millimeters of mercury pressure, and a refractive index, $n_D^{25}$ of 1.5180. The product had elemental analyses in percent as follows:

| | Carbon | Hydrogen | Nitrogen |
|---|---|---|---|
| Theory for $C_{13}H_{21}NO$ | 75.31 | 10.21 | 6.76 |
| Found | 75.62 | 10.48 | 6.82 |

EXAMPLE 2

*4-(Isobutyl-Methylamino)-3,5-Xylenol*

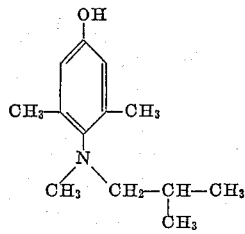

4-methylamino-3,5-xylenol was prepared as described in Example 1.

In a manner similar to that described in Example 1, 16 grams (0.106 mole) of 4-methylamino-3,5-xylenol prepared as above described, 18 milliliters (14.4 grams; 0.2 mole) of isobutyraldehyde, 2 grams of 5 percent palladium on charcoal, 2 grams of sodium acetate trihydrate, 100 milliliters of methanol were placed in a hydrogenation bomb and hydrogen introduced until a pressure of 50 p.s.i. was established. The bomb was shaken at room temperature for one hour to produce a 4-(isobutyl-methylamino)-3,5-xylenol product. The product after recovery as previously described and purification by distillation had a boiling point of 133° C. at 2 millimeters of mercury pressure and a refractive index, $n_D^{25}$ of 1.5218. The yield of the product was 19 grams or 87 percent of theoretical. The elemental analyses (percent) for the product were as follows:

| | Carbon | Hydrogen |
|---|---|---|
| Theory for $C_{13}H_{21}NO$ | 75.31 | 10.21 |
| Found | 75.28 | 10.07 |

EXAMPLE 3

*4-(Normal-Amyl-Methylamino)-5,3-Xylenol*

In a manner similar to that described in Example 2, 9 grams (0.06 mole) of 4-methylamino-3,5-xylenol, 9 grams (0.1 mole) of normal-valeraldehyde and hydrogen at 50 p.s.i. pressure were reacted in the presence of palladium on charcoal catalyst and methanol solvent to produce a 4-(normal-amyl-methylamino)-3,5-xylenol product as a viscous amber oil having a boiling point of 134° C. at 0.75 millimeter of mercury pressure and a refractive index, $n_D^{25}$ of 1.5113.

EXAMPLE 4

*4-[(2-Ethylbutyl)Methylamino]-3,5-Xylenol*

35 grams (0.35 mole) of 2-ethylbutyraldehyde was added to a solution of 34.3 grams (0.25 mole) of 4-amino-3,5-xylenol in 250 milliters of 1.03 normal aqueous hydrochloric acid. 35 grams of solid sodium acetate trihydrate was then added to the resultant slurry over a 40 minute period at room temperature, whereupon a reaction took place with the formation of an oily brown solid. The latter was recovered by filtration and purified by washing with water and then hexane, decolorizing with charcoal a carbon tetrachloride solution thereof, and then recrystallizing successively from carbon tetrachloride-hexane and methylene dichloride to obtain a 4-(2-ethylbutylidene)amino-3,5-xylenol intermediate as colorless needles, melting at 120°–122° C.

17 grams (0.078 mole) of 4-(2-ethylbutylidene)amino-3,5-xylenol, 3 grams of 5 percent palladium on charcoal and 300 milliliters of methanol were placed in the glass bomb of a low pressure hydrogenation apparatus. The air was purged and a hydrogen pressure of 50 p.s.i. established and the bomb then shaken. The theoretical amount of hydrogen was absorbed in 15 minutes to produce a 4-(2-ethylbutyl)amino-3,5-xylenol intermediate. At the end of this period, the bomb was vented and 2 grams of sodium acetate trihydrate and 12 milliliters (0.15 mole) of 37 percent aqueous formaldehyde solution were added to the hydrogenation mixture. The system was again purged and a pressure of 50 p.s.i. of hydrogen re-established, and the bomb again shaken. The theoretical amount of hydrogen was absorbed in a few minutes. The catalyst was then removed by filtration, most of the methanol solvent was removed by distillation under reduced pressure and water added to the oily residue. The oil on cooling to about 0° C. slowly solidified to produce a 4-[(2-ethylbutyl)-methylamino]-3,5-xylenol product as an oily solid melting at 33°–34° C.

EXAMPLE 5

*4-(Isobutyl-Ethylamino)-3,5-Xylenol*

In a manner similar to that employed in the preparation of 4-(2-ethylbutylidene)amino-3,5-xylenol and described in Example 4, 4-isobutylideneamino-3,5-xylenol having a melting point of 110°–114° C. was prepared from 37 grams (0.5 mole) of isobutyraldehyde and 50 grams (0.36) of 4-amino-3,5-xylenol.

In a manner similar to that described in Example 4, 30 grams of 4-isobutylideneamino-3,5-xylenol, 4 grams of 5 percent palladium on charcoal and 200 milliliters of methanol were placed in a low pressure hydrogenation bomb and hydrogen added to an initial pressure of 50 p.s.i. The theoretical amount of hydrogen was absorbed within 1 hour to produce a 4-isobutylamino-3,5-xylenol intermediate. Then 2 grams of sodium acetate and 15 grams of acetaldehyde were added thereto and hydrogen pressure again established and the reduction continued to obtain a 4-(isobutyl-ethylamino)-3,5-xylenol product. The latter after recovery and purification by distillation was a pale yellow oil boiling at 135°–146° C. at 1.75–1.50 millimeters of mercury pressure, which subsequently solidified to a waxy solid, having a melting point of

EXAMPLE 6

*4-(Isobutyl-Methylamino)-2,3,5-Trimethylphenol*

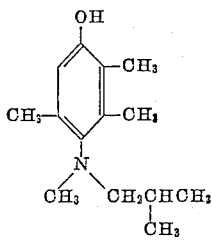

10 grams (0.14 mole) of isobutyraldehyde is added with stirring to a slurry of 13 grams (0.086 mole) of 4-amino-2,3,5-trimethylphenol in 70 milliliters of 50–50 (by volume) alcohol-water solution while the temperature is maintained between 50° and 60° C. The resulting reaction mixture is held at this temperature and stirring continued for 5 minutes after completion of the addition. Thereafter the reaction mixture is poured into an ice-water mixture to precipitate a 4-isobutylidene-2,3,5-trimethylphenol intermediate which after recrystallization from hexane melts from 87° to 90° C.

In a similar manner to that described in Example 4, 10 grams (0.066 mole) of 4-isobutylidene-2,3,5-trimethylphenol intermediate prepared as above described is placed in a hydrogenation bomb with 2 grams of 5 percent palladium on charcoal and 100 milliliters of methanol, and an initial hydrogen pressure of 50 p.s.i. established. The bomb is shaken until a theoretical amount of hydrogen is absorbed to produce a 4-isobutyl-2,3,5-trimethylphenol intermediate. 2 grams of sodium acetate trihydrate and 10 milliliters (0.12 mole) of 37 percent aqueous formaldehyde is added to the mixture, a hydrogen pressure of 50 p.s.i. again established and the bomb shaken for about one-half hour to produce the desired 4-(isobutyl-methylamino)-2,3,5-trimethylphenol product having a molecular weight of 221.

EXAMPLE 7

*4-(Ethyl-(2Ethylbutyl)Amino)Carvacrol*

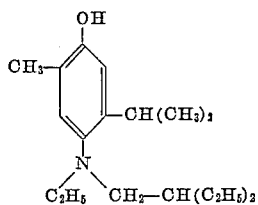

In a manner similar to that previously described, 4-aminocarvacrol and 2-ethylbutyraldehyde are reacted together to produce an intermediate 4-(2-ethylbutylideneamino)carvacrol. The latter is then reacted with hydrogen over palladium on charcoal catalyst to produce the intermediate 4-(2-ethylbutylamino)carvacrol. The latter is then reacted with acetaldehyde and hydrogen over palladium on charcoal to produce the desired 4-(ethyl-(2-ethylbutyl)amino)carvacrol having a molecular weight of 277.

EXAMPLE 8

In similar operations, the following unsymmetrical dialkylaminophenols are prepared:

4 - (ethyl - normal - propylamino) - 5 - ethyl - 2 - methylphenol having a molecular weight of 221 by the reaction of 4-amino-5-ethyl-2-methylphenol with propionaldehyde to produce an intermediate 4-normal-propylideneamino-5-ethyl-2-methylphenol followed by reduction of the latter with hydrogen in the presence of palladium-charcoal catalyst to produce an intermediate 4-normal-propylamino-5-ethyl-2-methylphenol followed by reaction of the latter with acetaldehyde in the presence of palladium-charcoal.

4-(normal-butyl-normal-hexylamino)-m-cresol having a molecular weight of 263 by the reaction of 4-amino-m-cresol with normal butyraldehyde to produce an intermediate 4-normal-butylideneamino-m-cresol followed by reduction of the latter with hydrogen in the presence of palladium-charcoal catalyst to produce an intermediate 4-normal-butylamino-m-cresol followed by the reaction of the latter with normal-hexaldehyde and hydrogen in the presence of palladium-charcoal.

4-(ethyl-methylamino)-3-tertiary-butylphenol having a molecular weight of 207 by the reaction of 4-amino-3-tertiary butylphenol with dimethyl sulfate followed by treatment with alkali to produce an intermediate 4-methylamino-3-tertiary-butylphenol followed by the reaction of the latter with acetaldehyde and hydrogen in the presence of palladium-charcoal catalyst.

4-(ethyl-normal-propylamino)-2,6-dimethylphenol having a molecular weight of 207 by the reaction of 4-amino-2,6-dimethylphenol with propionaldehyde to produce an intermediate 4-propylideneamino-2,6-dimethylphenol followed by the reaction of the latter with acetaldehyde and hydrogen in the presence of palladium-charcoal catalyst.

4-[normal-propyl-(2-methylamyl)amino]-2-ethylphenol having a molecular weight of 263 by the reaction of 4-amino-2-ethyl-phenol with 2-methyl valeraldehyde to produce an intermediate 4-(2-methylpentylideneamino)-2-ethylphenol followed by the reduction of the latter with hydrogen in the presence of palladium-charcoal catalyst to produce an intermediate 4-(2-methylamylamino-2-ethylphenol followed by the reaction of the latter with normal-propionaldehyde and hydrogen in the presence of palladium-charcoal catalyst.

The products of this invention are useful for the control of bacteria and fungi and are adapted to be employed in germicidal compositions. Thus, they may be employed to inhibit the growth of microorganisms as represented by such species as *Staphylococcus aureus, Salmonella typhosa, Aerobacter aerogenes, Erwinia carotovora, Aspergillus terreus, Pullaria pullalans, Penicillium digitatum* and *Rhizopus nigricans*. In representative operations for the control of bacteria and fungi, agar media containing 0.25 percent by weight of the various unsymmetrical dialkylaminophenols are plated in separate operations on Petri dishes and streaked with *Staphylococcus aureus* and *Aspergillus terreus*. The plated Petri dishes are incubated for 3 days at 30° C. Examination of the plates at the end of this period shows complete inhibition of growth of the test organisms.

The compounds of this invention are also useful for the preparation of insecticidal unsymmetrical 4-dialkylaminophenyl methylcarbamates having the structure

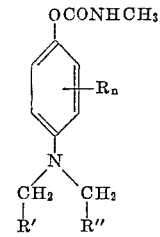

In such use, the appropriate dialkylaminophenol is reacted with a substantially equimolar proportion of methyl isocyanate in an inert solvent and in the presence of a catalytic amount of tertiary amine. Suitable solvents for carrying out the reaction include dimethylformamide, methylene dichloride, hexane or triethylamine. Suitable catalysts for the reaction include triethylamine, trimethylamine and pyridene. The reaction takes place in the temperature range of from about 25° to 50° C. After completion of the reaction, the mixture is concentrated by vaporizing the excess solvent and then cooling to precipitate the desired unsymmetrical dialkylaminophenyl methylcarbamate product. The latter may be recovered and purified according to conventional procedures.

In a representative operation for such use, 2.5 milliliters (0.44 mole) of methyl isocyanate and a few drops of triethylamine catalyst are added with stirring to a solution of 7.4 grams (0.036 mole) 4-(normal-butyl-methylamino)-3,5-xylenol in 50 milliliters of pentane and the resulting reaction mixture allowed to stand overnight at room temperature. At the end of this period, the pentane solvent and unreacted starting materials are removed by distillation to obtain as residue a 4-(normal-butyl-methylamino)-xylyl methylcarbamate product as a viscous oil having a refractive index, $n_D{}^{25°}$ of 1.5135.

The products of this invention are also useful as curing agents for epoxy resins. In such use, the compounds of the present invention are added to epoxy resin compositions in an amount sufficient to harden said resin.

The reactant aminophenols to be employed for the preparation of the unsymmetrical dialkylphenols of the present invention may be prepared according to one of the following methods.

(A) Via an azo-coupling method wherein:

(1) An appropriate phenol in aqueous alkaline solution is reacted with diazotized sulfanilic acid in the temperature range of from —5° C. to 30° C. for from 5 minutes to 12 hours to produce an intermediate azo compound as its sodium salt.

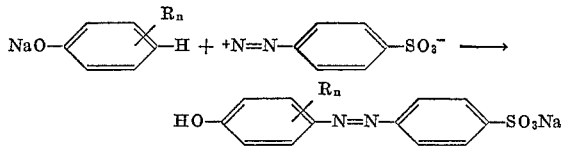

(2) The intermediate sodium salt of the azo compound is reduced by treating with sodium hydrosulfite at a temperature of from about 80° to 90° C. to produce a p-aminophenol.

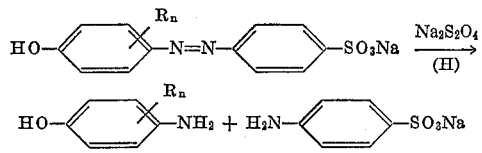

(B) Via a reductive alkylation method wherein:

(1) The appropriate phenol is nitrosated by portionwise addition with stirring of sodium nitrite to a mixture of the phenol and concentrated hydrochloric acid in an appropriate solvent such as ethanol at a temperature of from 0° to about 15° C., and stirring the resulting mixture for a period of from 0.5 to 4 hours to produce the intermediate p-nitroso derivative of the phenol.

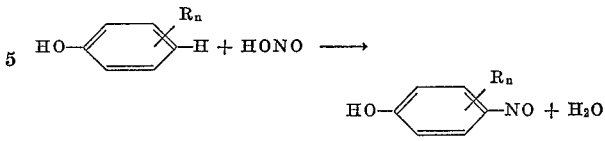

(2) The intermediate p-nitroso derivative of the phenol is reduced by treating with hydrogen in the presence of palladium on charcoal catalyst at a pressure of from 20 to 50 pounds per square inch and a temperature of from 15 to 50° C. to produce the desired aminophenol.

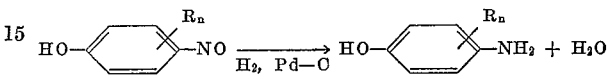

I claim:
1. An unsymmetrical dialkylaminophenol having the structure

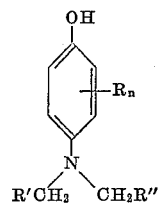

wherein each R is an alkyl radical containing from 1 to 4 carbon atoms, inclusive, R' is a radical selected from the group consisting of hydrogen and alkyl containing from 1 to 5 carbon atoms, inclusive, R" is an alkyl radical containing from 1 to 5 carbon atoms, inclusive, $n$ is an integer of from 1 to 3, inclusive, and wherein R' and R" are always different radicals and the total carbon content of $R_n$ is not greater than 4.

2. 4-(methyl-normal-butylamino)-3,5-xylenol.
3. 4-(methyl-isobutylamino)-3,5-xylenol.
4. 4-(methyl-normal-amylamino)-3,5-xylenol.
5. 4-(methyl(2-ethylbutyl)amino)-3,5-xylenol.
6. 4-(ethyl-isobutylamino)-3,5-xylenol.

References Cited in the file of this patent
UNITED STATES PATENTS

| | | |
|---|---|---|
| 2,220,065 | Clarkson | Nov. 5, 1940 |
| 2,250,501 | Rosenwald et al. | July 24, 1941 |
| 2,270,215 | Fitch | Jan. 13, 1942 |
| 2,388,607 | Emerson | Nov. 6, 1945 |
| 2,571,053 | Myers | Oct. 9, 1951 |
| 2,776,197 | Gysin | Jan. 1, 1957 |
| 2,776,313 | Lappin et al. | Jan. 1, 1957 |
| 2,939,851 | Orchin | June 7, 1960 |

OTHER REFERENCES

Stevens et al.: J.A.C.S., vol. 63 (1941), pp. 308–311.
Kalbezen et al.: J. Agricultural and Food Chemistry, vol. 2, (1954), pp. 864–70.